(12) United States Patent
Xu et al.

(10) Patent No.: US 8,683,813 B2
(45) Date of Patent: Apr. 1, 2014

(54) MULTI-LOBED COOLING HOLE AND METHOD OF MANUFACTURE

(75) Inventors: JinQuan Xu, Groton, CT (US); Mark F. Zelesky, Bolton, CT (US); Atul Kohli, Tolland, CT (US); Matthew S. Gleiner, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/544,071

(22) Filed: Jul. 9, 2012

(65) Prior Publication Data

US 2013/0205801 A1      Aug. 15, 2013

Related U.S. Application Data

(60) Provisional application No. 61/599,379, filed on Feb. 15, 2012, provisional application No. 61/599,381, filed on Feb. 15, 2012.

(51) Int. Cl.
*F02C 7/12* (2006.01)

(52) U.S. Cl.
USPC ............................................ 60/806; 415/115

(58) Field of Classification Search
USPC .................... 60/752–760, 806; 415/115–116; 416/96 R, 97 R
See application file for complete search history.

(56) References Cited

U.S. PATENT DOCUMENTS

| | | |
|---|---|---|
| 4,197,443 A | 4/1980 | Sidenstick |
| 4,529,358 A | 7/1985 | Papell |
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |
| 4,738,588 A | 4/1988 | Field |
| 5,062,768 A | 11/1991 | Marriage |
| 5,096,379 A | 3/1992 | Stroud et al. |

(Continued)

FOREIGN PATENT DOCUMENTS

| | | |
|---|---|---|
| EP | 1326007 A2 | 7/2003 |
| EP | 1609949 A1 | 12/2005 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Phutthiwat Wongwian
(74) *Attorney, Agent, or Firm* — Kinney & Lange, P.A.

(57) ABSTRACT

A gas turbine engine component includes a wall having first and second wall surfaces and a cooling hole extending through the wall. The cooling hole includes an inlet at the first wall surface, an outlet at the second wall surface, a metering section extending downstream from the inlet and a diffusing section extending from the metering section to the outlet. The diffusing section includes a first lobe diverging longitudinally and laterally from the metering section, a second lobe adjacent the first lobe and diverging longitudinally from the metering section, a third lobe adjacent the second lobe and diverging longitudinally and laterally from the metering section, and a transition region having an end adjacent the outlet and a portion that extends between the lobes and the outlet. The first and third lobes each include a curved outer portion.

28 Claims, 16 Drawing Sheets

(56) References Cited

U.S. PATENT DOCUMENTS

| | | | |
|---|---|---|---|
| 5,129,231 | A | 7/1992 | Becker et al. |
| 5,252,026 | A | 10/1993 | Shepherd |
| 5,326,224 | A | 7/1994 | Lee et al. |
| 5,358,374 | A | 10/1994 | Correia et al. |
| 5,382,133 | A | 1/1995 | Moore et al. |
| 5,418,345 | A | 5/1995 | Adamski |
| 5,419,681 | A | 5/1995 | Lee |
| 5,609,779 | A | 3/1997 | Crow et al. |
| 5,651,662 | A | 7/1997 | Lee et al. |
| 5,660,525 | A | 8/1997 | Lee et al. |
| 5,683,600 | A | 11/1997 | Kelley et al. |
| 5,813,836 | A | 9/1998 | Starkweather |
| 6,139,258 | A | 10/2000 | Lang, III et al. |
| 6,183,199 | B1 | 2/2001 | Beeck et al. |
| 6,241,468 | B1 | 6/2001 | Lock et al. |
| 6,243,948 | B1 | 6/2001 | Lee et al. |
| 6,287,075 | B1 | 9/2001 | Kercher |
| 6,307,175 | B1 | 10/2001 | Blochlinger et al. |
| 6,494,678 | B1 | 12/2002 | Bunker |
| 6,547,524 | B2 | 4/2003 | Kohli et al. |
| 6,572,335 | B2 | 6/2003 | Kuwabara et al. |
| 6,744,010 | B1 | 6/2004 | Pepe et al. |
| 6,944,580 | B1 | 9/2005 | Blume et al. |
| 6,973,419 | B1 | 12/2005 | Fortin et al. |
| 6,979,176 | B2 | 12/2005 | Nakamata et al. |
| 7,186,085 | B2 | 3/2007 | Lee |
| 7,273,351 | B2 | 9/2007 | Kopmels |
| 7,328,580 | B2 | 2/2008 | Lee et al. |
| 7,374,401 | B2 | 5/2008 | Lee |
| 7,578,653 | B2 | 8/2009 | Klasing et al. |
| 7,726,131 | B2 | 6/2010 | Sze et al. |
| 7,766,609 | B1 | 8/2010 | Liang |
| 7,887,294 | B1 | 2/2011 | Liang |
| 7,997,868 | B1 | 8/2011 | Liang |
| 8,038,399 | B1 | 10/2011 | Liang |
| 8,057,181 | B1 | 11/2011 | Liang |
| 8,245,519 | B1 * | 8/2012 | Liang ................... 60/806 |
| 2001/0036401 | A1 | 11/2001 | Harvey et al. |
| 2002/0159888 | A1 | 10/2002 | Rinck et al. |
| 2005/0106020 | A1 | 5/2005 | Bunker et al. |
| 2005/0286998 | A1 | 12/2005 | Lee et al. |
| 2008/0003096 | A1 | 1/2008 | Kohli et al. |
| 2008/0145208 | A1 | 6/2008 | Klasing et al. |
| 2008/0286090 | A1 * | 11/2008 | Okita ................... 415/115 |
| 2009/0013695 | A1 | 1/2009 | Dierberger et al. |
| 2009/0304499 | A1 | 12/2009 | Strock et al. |
| 2010/0040459 | A1 * | 2/2010 | Ohkita .................. 415/177 |
| 2010/0068032 | A1 | 3/2010 | Liang |
| 2010/0068068 | A1 | 3/2010 | Liang |
| 2010/0282721 | A1 | 11/2010 | Bunker et al. |
| 2011/0097191 | A1 | 4/2011 | Bunker |
| 2011/0185572 | A1 | 8/2011 | Wei et al. |
| 2011/0293423 | A1 | 12/2011 | Bunker et al. |
| 2012/0051941 | A1 | 3/2012 | Bunker |
| 2012/0167389 | A1 | 7/2012 | Lacy et al. |

OTHER PUBLICATIONS

International Search Report and Written Opinion, dated Nov. 11, 2013, for PCT Application No. PCT/US2013/025715, 15 pages.

* cited by examiner

MULTI-LOBED COOLING HOLE AND METHOD OF MANUFACTURE

CROSS-REFERENCE TO RELATED APPLICATIONS

This application claims priority to U.S. Provisional Application No. 61/599,379, filed on Feb. 15, 2012 and entitled "MULTI-LOBED COOLING HOLE AND METHOD OF MANUFACTURE" and U.S. Provisional Application No. 61/599,381, filed on Feb. 15, 2012 and entitled "TRI-LOBED COOLING HOLE AND METHOD OF MANUFACTURE", the disclosures of which are incorporated by reference in their entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally and laterally from the metering section, a second lobe adjacent the first lobe and diverging longitudinally from the metering section, a third lobe adjacent the second lobe and diverging longitudinally and laterally from the metering section, and a transition region having an end adjacent the outlet and a portion that extends between the lobes and the outlet. The first and third lobes each include a curved outer portion.

A wall of a component of a gas turbine engine includes first and second wall surfaces, an inlet located at the first wall surface, an outlet located at the second wall surface, a metering section commencing at the inlet and extending downstream from the inlet and a diffusing section extending from the metering section and terminating at the outlet. The diffusing section includes a first lobe diverging longitudinally and laterally from the metering section, a second lobe adjacent the first lobe and diverging longitudinally from the metering section, a third lobe adjacent the second lobe and diverging longitudinally and laterally from the metering section, and a transition region having an end adjacent the outlet and a portion that extends between the lobes and the outlet.

A method for producing a cooling hole in a gas turbine engine wall having first and second wall surfaces includes forming a metering section, forming a center lobe, forming a first side lobe, forming a second side lobe and forming a transition region. The metering section is formed between the first wall surface and the second wall surface, and the metering section meters a flow of fluid through the cooling hole. The center lobe is formed between the metering section and the second wall surface, and the center lobe extends axially from the metering section and diverges longitudinally from the metering section. The first side lobe is formed between the metering section and the second wall surface on a first side of the center lobe, and the first side lobe diverges longitudinally and laterally from the metering section. The second side lobe is formed between the metering section and the second wall surface on a second side of the center lobe opposite the first side, and the second side lobe diverges longitudinally and laterally from the metering section. The transition region is formed downstream of at least one of the lobes, such that the transition region extends between the lobes and the outlet.

A gas turbine engine component includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally from the metering section, a second lobe adjacent the first lobe and diverging longitudinally from the metering section, a third lobe adjacent the second lobe and diverging longitudinally from the metering section, and a transition region having an end adjacent the outlet and a portion that extends between the lobes and the outlet.

DETAILED DESCRIPTION

Figure 1:
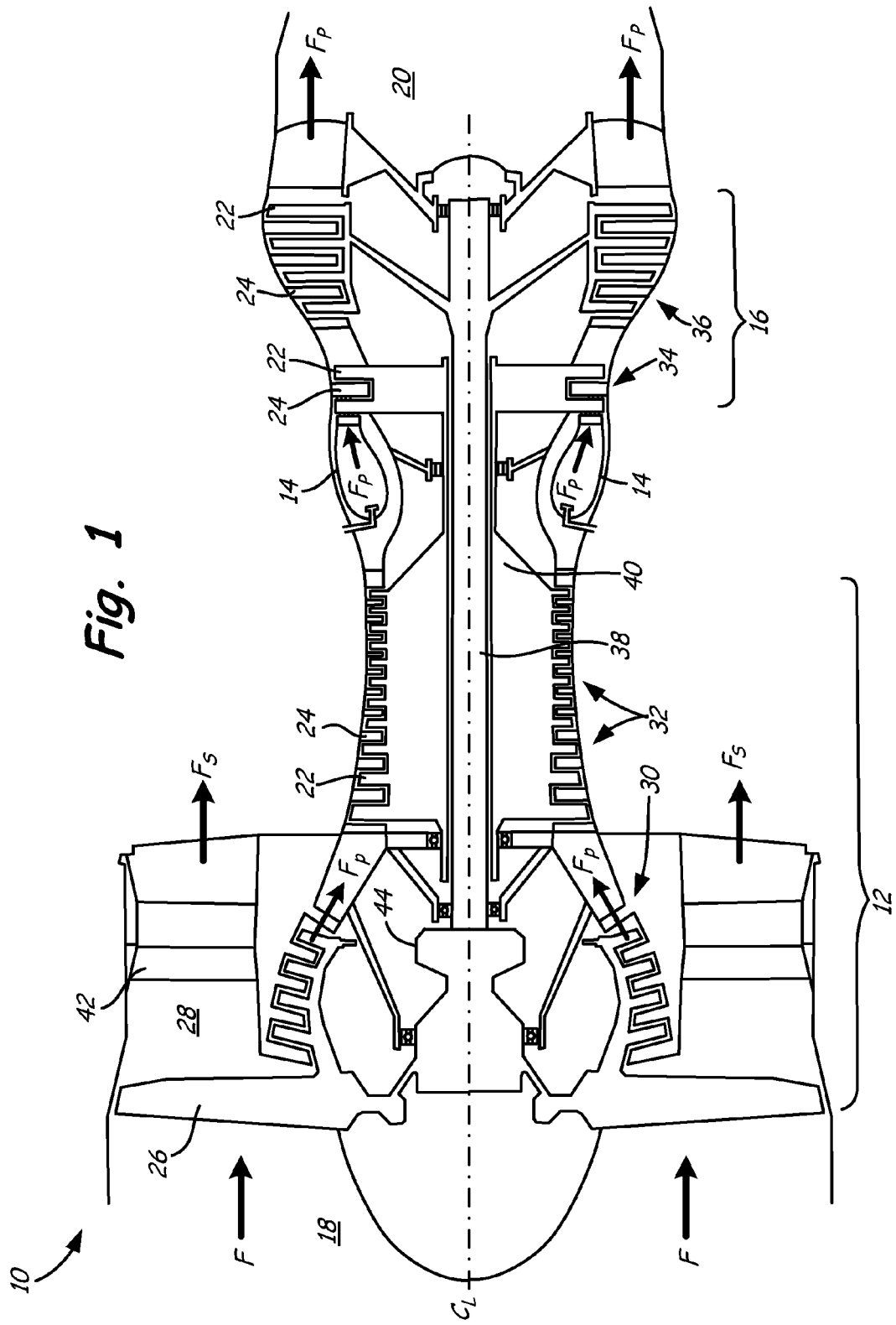
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow Fp and secondary (bypass) flow $F_s$ downstream of fan rotor 26. Fan rotor 26 accelerates secondary flow $F_s$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_p$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
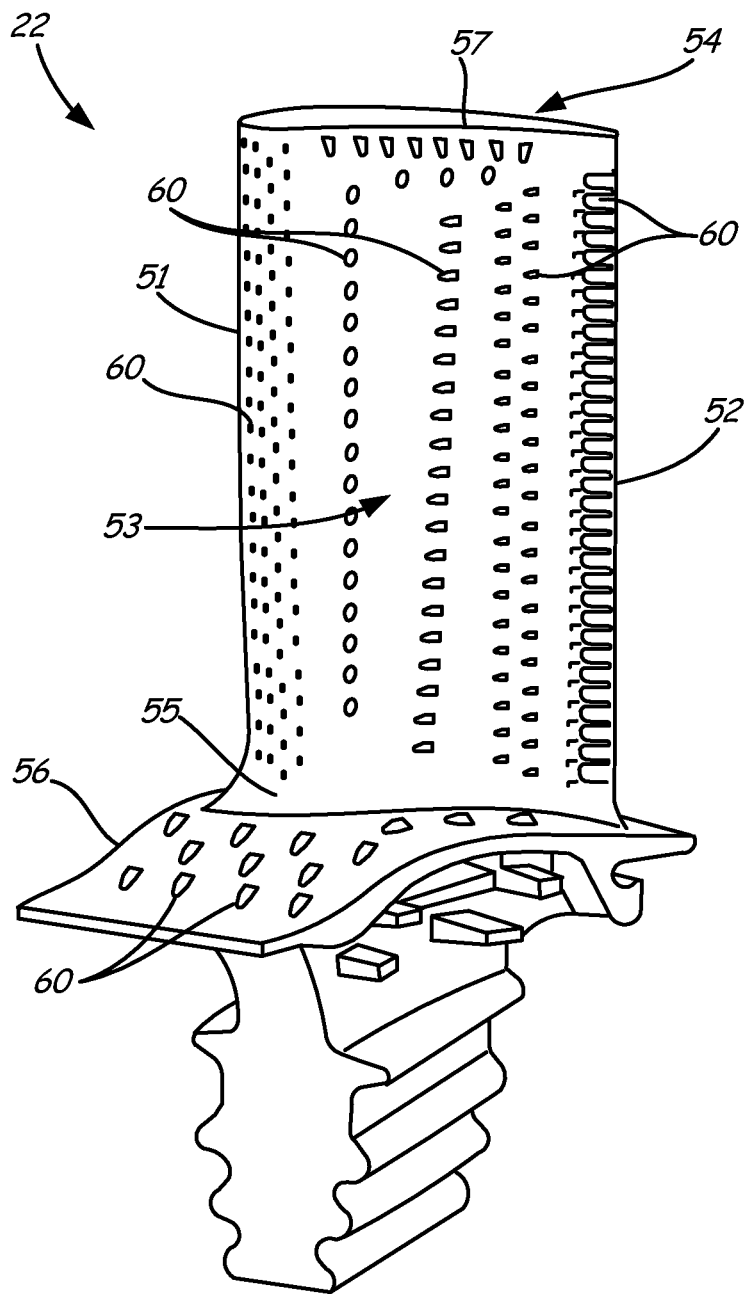
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
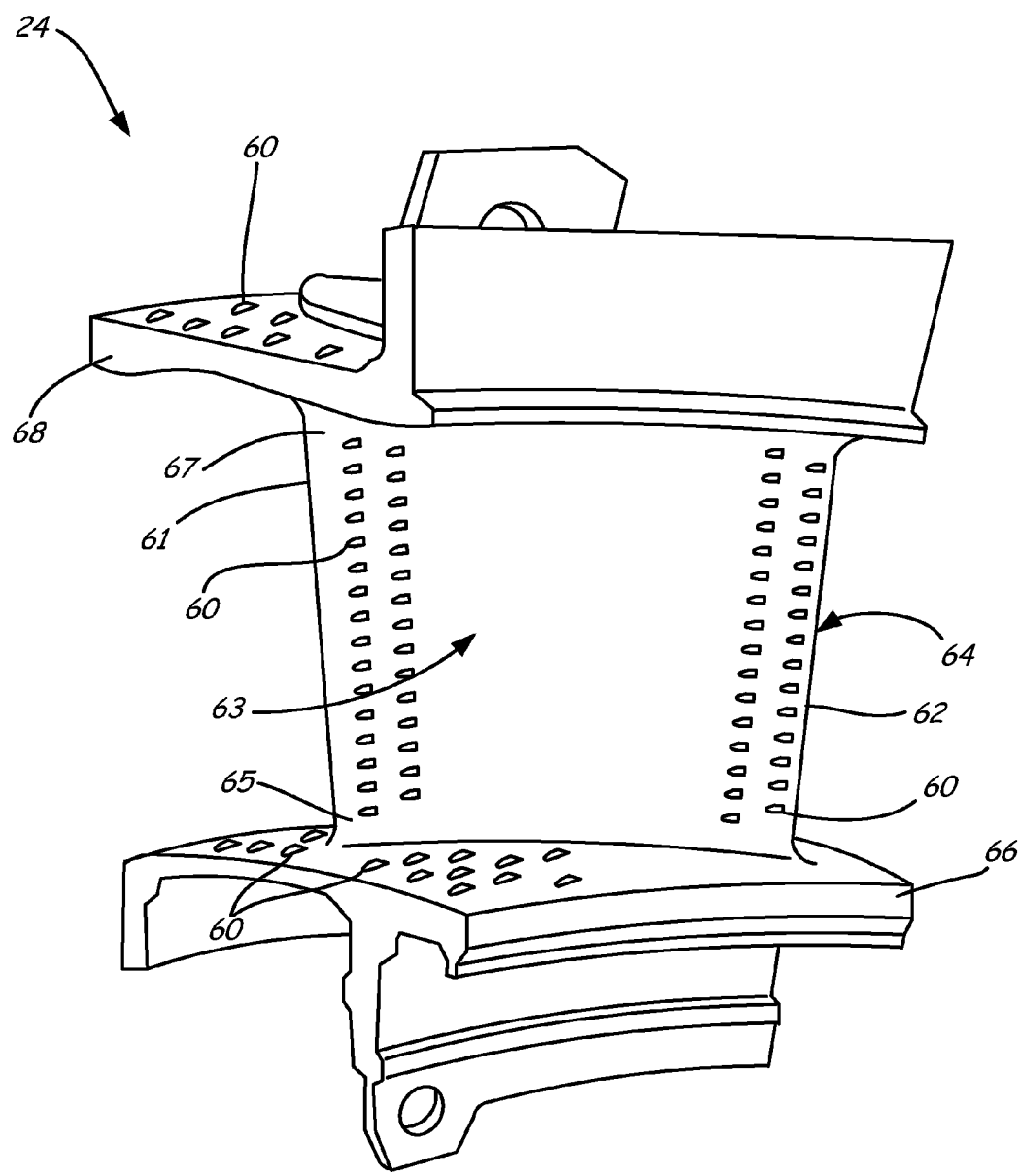
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

The multi-lobed cooling holes described herein provide a cooling solution that offers improved film cooling coverage and eliminates or reduces the problems associated with conventional diffusion film cooling holes, such as flow separation and blow off. Multi-lobed cooling holes provide improved film effectiveness and reduce the likelihood of film separation so that they work as intended at high blowing ratios and reduce detrimental effects such as kidney vortices.

Figure 3:
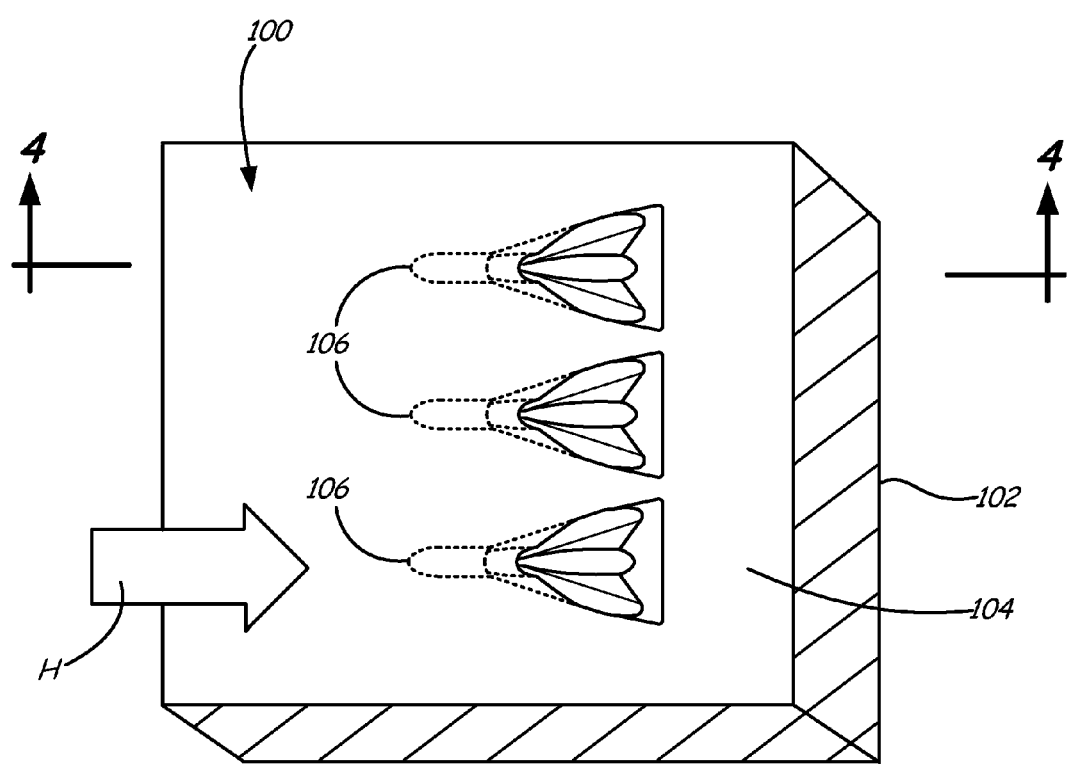
FIG. 3 is a view of a wall having multi-lobed cooling holes.

Gas turbine engine components exposed to hot gas flow typically include a wall in which film cooling may be utilized. FIG. 3 illustrates a view of a wall of a gas turbine engine component having multi-lobed film cooling holes. Wall 100 includes inner wall surface 102 and outer wall surface 104. As described in greater detail below, wall 100 is primarily metallic and outer wall surface 104 can include a thermal barrier coating. Multi-lobed film cooling holes 106 are oriented so that their inlets are positioned on the first wall surface 102 and their outlets are positioned on outer wall surface 104. During gas turbine engine operation, outer wall surface 104 is in proximity to high temperature gases (e.g., combustion gases, hot air). Cooling air is delivered inside wall 100 where it exits the interior of the component through cooling holes 106 and forms a cooling film on outer wall surface 104. As shown in FIG. 3, cooling holes 106 have three lobes in the diffusing section of the cooling hole outlet.

As described below in greater detail, cooling air flows out of cooling holes 106, with cooling air flowing through each of the lobes in the diffusing section. Cooling holes 106 can be arranged in a row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along outer wall surface 104 (represented by arrow H). As shown in FIG. 3, the row of cooling holes 106 is substantially perpendicular to the direction of flow H. In alternate embodiments, the orientation of cooling holes 106 can be arranged on outer wall surface 104 so that the flow of cooling air is perpendicular to the high temperature gas flow (i.e. cooling air exits cooling holes 106 radially) or at an angle between parallel and perpendicular. Cooling holes 106 can also be provided in other formations on wall 100, such as a staggered formation. Cooling holes 106 can be located on a variety of components that require cooling. Suitable components include, but are not limited to, turbine vanes and blades, combustors, blade outer air seals, augmentors, etc. Cooling holes 106 can be located on the pressure side or suction side of vanes and blades. Cooling holes 106 can also be located on the blade tip or blade or vane platforms.

Figure 4A:
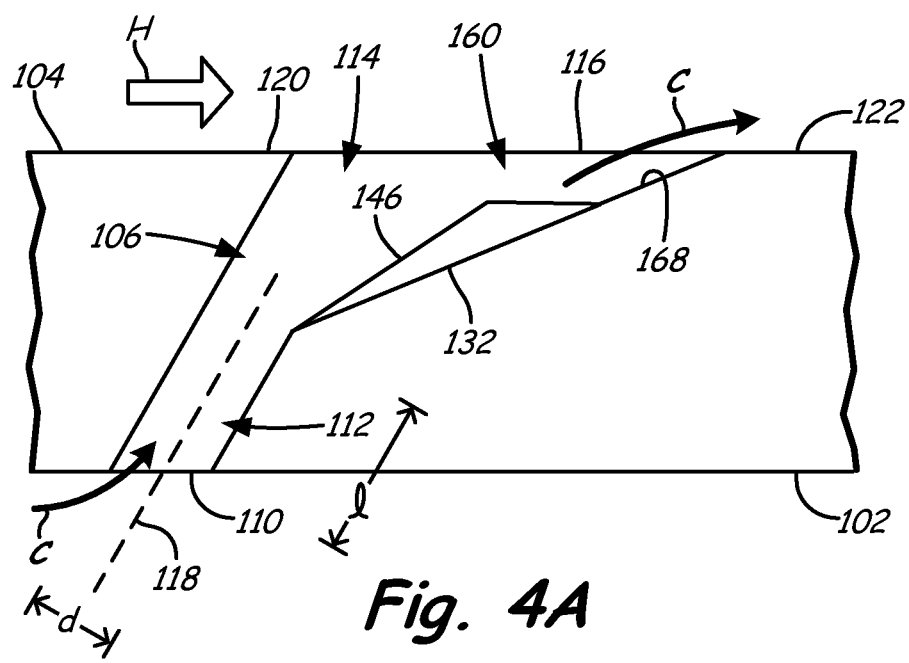
FIG. 4A is a sectional view of one embodiment of the multi-lobed cooling hole of FIG. 3 taken along the line 4-4.
Figure 5:
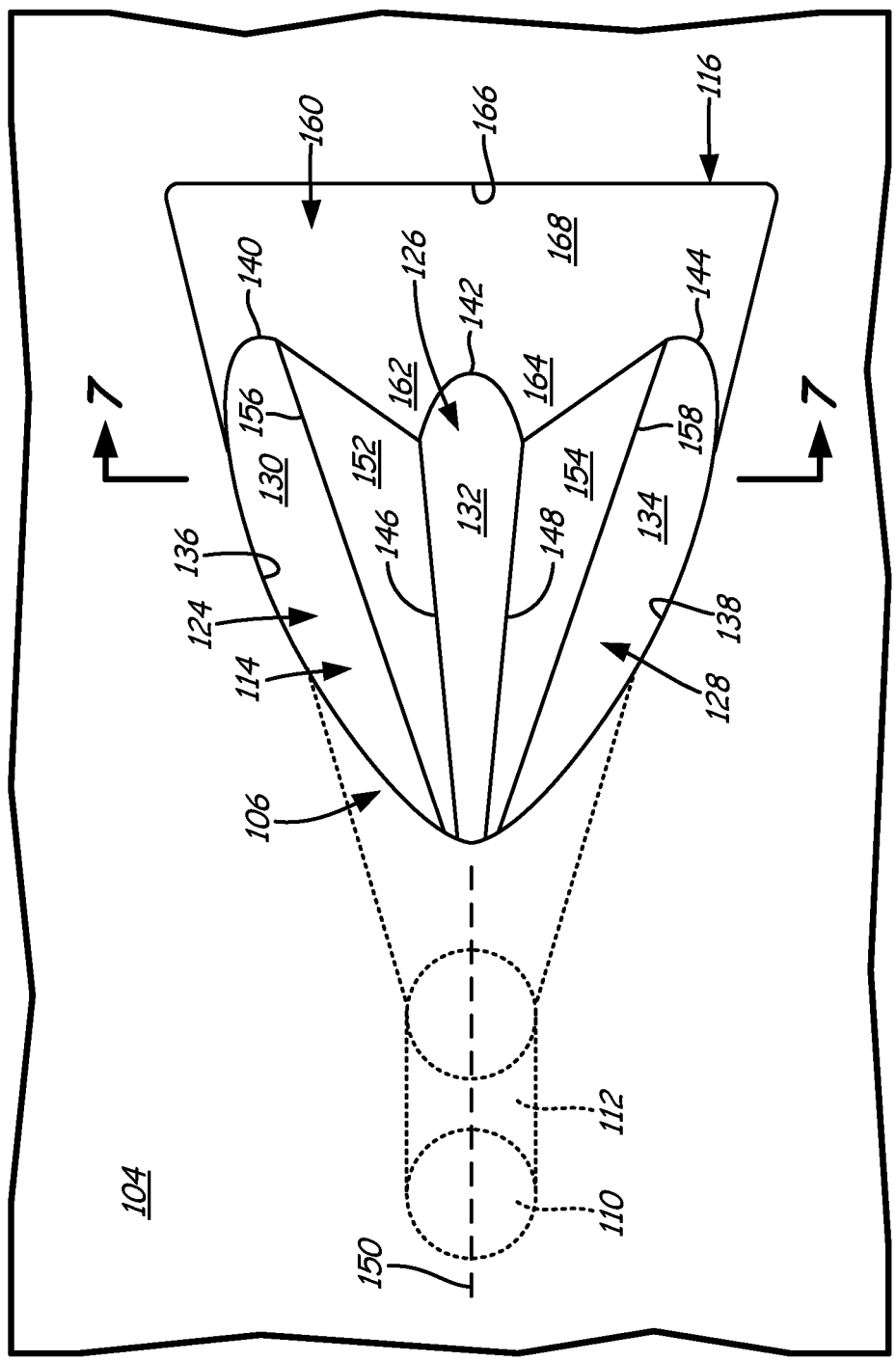
FIG. 5 is a view of one of the multi-lobed cooling holes of FIG. 3.

FIGS. 4A and 5 illustrate one embodiment of cooling hole 106 in greater detail. FIG. 4A illustrates a sectional view of multi-lobed film cooling hole 106 of FIG. 3 taken along the line 4-4. FIG. 5 illustrates a more detailed view of cooling hole 106 of FIG. 3. Cooling hole 106 includes inlet 110, metering section 112, diffusing section 114 and outlet 116. Inlet 110 is an opening located on inner wall surface 102. Cooling air C enters cooling hole 106 through inlet 110 and passes through metering section 112 and diffusing section 114 before exiting cooling hole 106 at outlet 116 along outer wall surface 104.

Metering section 112 is adjacent to and downstream from inlet 110 and controls (meters) the flow of cooling air through cooling hole 106. In exemplary embodiments, metering section 112 has a substantially constant flow area from inlet 110 to diffusing section 114. Metering section 112 can have circular, oblong (oval or elliptical) or racetrack (oval with two parallel sides having straight portions) shaped cross sections. In FIGS. 4A and 5, metering section 112 has a circular cross section. Circular metering sections 112 have a length l and diameter d. In exemplary embodiments, inlet 110 and metering section 112 have the same diameter d. In some embodiments, circular metering section 112 has a length l according to the relationship: $d \leq l \leq 3d$. That is, the length of metering section 112 is between one and three times its diameter. The length of metering section 112 can exceed 3d, reaching upwards of 30d. In alternate embodiments, metering section 112 has a non-circular cross section such as an oblong or racetrack-shape, with metering section 112 having a length l and hydraulic diameter $d_h$. In some embodiments, metering section 112 has a length l according to the relationship: $d_h \leq l \leq 3d_h$. That is, the length of metering section 112 is between one and three times its hydraulic diameter. The length of metering section 112 can exceed $3d_h$, reaching upwards of $30d_h$. In exemplary embodiments, metering section 112 is inclined with respect to wall 100 as illustrated in FIG. 4A (i.e. metering section 112 is not perpendicular to wall 100). Metering section 112 has a longitudinal axis represented by numeral 118. Longitudinal axis 118 represents the angle of metering section 112 between first wall surface 102 and second wall surface 104.

Diffusing section 114 is adjacent to and downstream from metering section 112. Cooling air C diffuses within diffusing section 114 before exiting cooling hole 106 along outer wall surface 104. Outer wall surface 104 includes upstream end 120 (upstream of cooling hole 106) and downstream end 122 (downstream from cooling hole 106). Diffusing section 114 opens along outer wall surface 104 between upstream end 120 and downstream end 122. As shown in FIG. 4A, cooling air C diffuses away from longitudinal axis 118 in diffusing section 114 as it flows towards outlet 116.

As shown best in FIG. 5, diffusing section 114 includes three channel-like lobes 124, 126 and 128 as described in the U.S. Provisional Application No. 61/599,381, filed on Feb. 15, 2012 and entitled "TRI-LOBED COOLING HOLE AND METHOD OF MANUFACTURE", which is incorporated by reference. Lobes 124, 126 and 128 are surfaces of wall 100 which define the void of cooling hole 106 at diffusing section 114. Each lobe 124, 126 and 128 has a bottom surface (bottom surfaces 130, 132 and 134, respectively). Lobes 124 and 128 each have a side wall along the outer edge of diffusing section 114 (side walls 136 and 138, respectively). Each lobe 124, 126 and 128 also has a trailing edge (trailing edges 140, 142 and 144, respectively). Lobes 124 and 126 meet along ridge 146, and lobes 126 and 128 meet along ridge 148. FIG. 4A illustrates a sectional view taken through the center of cooling hole 106 and shows ridge 146 between lobes 124 and 126. In this embodiment, bottom surfaces 130, 132 and 134 are inclined at the same angle (represented by bottom surface 132 in FIG. 4A). In other embodiments, bottom surfaces 130, 132 and 134 can be inclined at different angles.

Lobes 124 and 128 diverge longitudinally and laterally from metering section 112. Lobe 126 diverges longitudinally from metering section 112. In some embodiments, lobe 126 also diverges laterally from metering section 112. FIG. 4A best illustrates the longitudinal divergence (from longitudinal axis 118), while FIG. 5 best illustrates the lateral divergence (from centerline axis 150). Centerline axis 150 extends through the center of metering section 112. As shown in FIG. 5, first lobe 124 laterally diverges upwards from centerline axis 150 and third lobe 128 laterally diverges downwards from centerline axis 150. In the embodiment shown in FIG. 5, second lobe 126 does not diverge laterally from metering section 112 as second lobe 126 has a smaller width than diameter d (or $d_h$) of metering section 112. However, second lobe 126 does diverge laterally in the downstream direction with respect to the upstream portion of second lobe 126. In other embodiments, second lobe 126 has a greater width than diameter d (or $d_h$) of metering section 112 and also diverges laterally with respect to metering section 112.

Cooling air C leaving metering section 112 and entering diffusing section 114 diffuses into lobes 124, 126 and 128, causing the cooling air to spread laterally within diffusing section 114. Side wall 136, ridge 146 and bottom surface 130 direct cooling air C through first lobe 124. Ridges 146 and 148 and bottom surface 132 direct cooling air C through second lobe 126. Side wall 138, ridge 148 and bottom surface 134 direct cooling air C through third lobe 128. Cooling air C flowing through diffusing section 114 diverges longitudinally from longitudinal axis 118 as it "attaches" to bottom surfaces 130, 132 and 134 of respective lobes 124, 126 and 128.

Figure 4B:
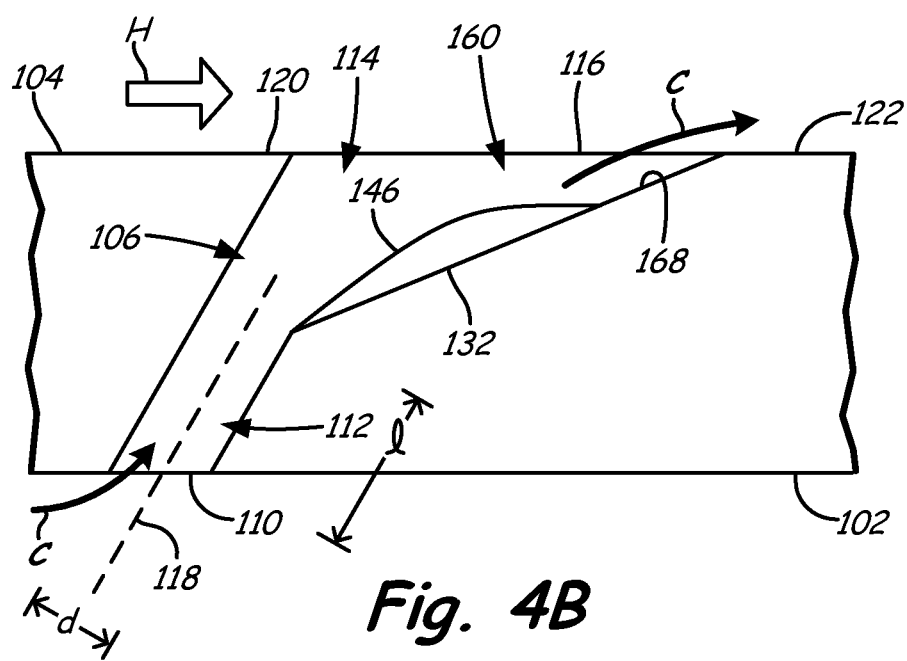
FIG. 4B is a sectional view of another embodiment of the multi-lobed cooling hole of FIG. 3 taken along the line 4-4

Ridges 146 and 148 aid in directing cooling air C into lobes 124, 126 and 128. Ridges 146 and 148 are generally inverted V-shaped portions where adjacent lobes meet. Ridges 146 and 148 can form a sharp edge between the lobes, where edges of adjacent lobes meet at a point. Alternatively, ridges 146 and 148 can be rounded or have other geometric shapes. Ridges 146 and 148 can form a straight line between adjacent lobes as shown in FIG. 5. Alternatively, ridges 146 and 148 can be curved. Ridges 146 and 148 can also curve with respect to bottom surfaces 130, 132 and 134 of lobes 124, 126 and 128 as shown in FIG. 4B.

As cooling air C exits metering section 112 and enters diffusing section 114, cooling air C encounters ridges 146 and 148. Ridges 146 and 148 extend farther towards outer wall surface 104 than lobes 124, 126 and 128 as shown in FIG. 4A. As a result, ridges 146 and 148 project towards outer wall surface 104 and serve to guide the flow of cooling air C into lobes 124, 126 and 128. Ridge 146 divides the flow of cooling air C between lobes 124 and 126, causing cooling air C flowing into lobe 124 to diverge laterally to correspond to the shape of lobe 124. Ridge 148 divides the flow of cooling air C between lobes 126 and 128, causing cooling air C flowing into lobe 128 to diverge laterally to correspond to the shape of lobe 128. Ridges 146 and 148 do not necessarily divide the flow of cooling air 26 between adjacent lobes equally.

In some embodiments, bottom surfaces 130, 132 and 134 of lobes 124, 126 and 128, respectively, include a curved portion. As shown in FIG. 5, the outer portion of lobes 124 and 128 can be curved. Lobe 124 includes a curved surface at side wall 136 and a curved bottom surface 130. Lobe 128 includes a curved surface at side wall 138 and a curved bottom surface 134. Second lobe 126 includes a curved bottom surface 132. In this embodiment, bottom surfaces 130, 132 and 134 are concave (i.e. the surfaces' arcs curve towards inner wall surface 102). Curved surfaces at side walls 136 and 138 and curved bottom surfaces 130, 132 and 134 aid in improving the attachment of cooling air C to lobes 124, 126 and 128. By improving cooling flow attachment to the lobes, cooling air C can spread laterally without separation to improve cooling film formation and cooling film effectiveness.

Figure 7:
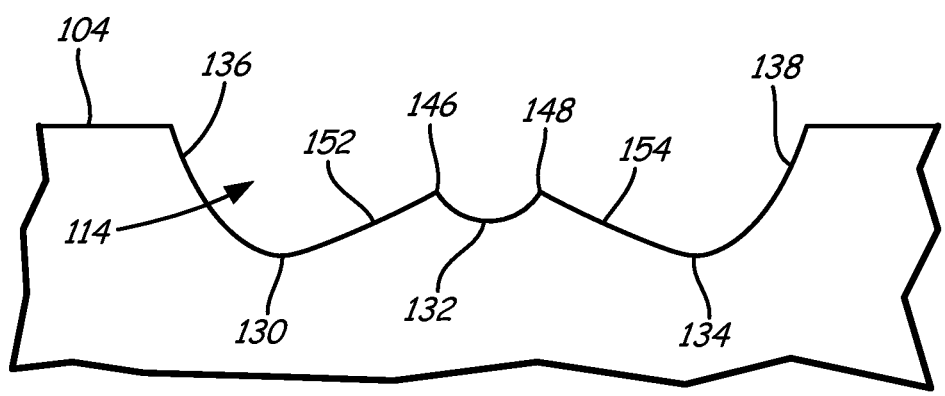
FIG. 7 is a cross-sectional view of the cooling hole of FIG. 5 taken along the line 7-7.

In addition to curved surfaces, bottom surfaces 130 and 134 of lobes 124 and 128, respectively, can also include a substantially planar portion. As shown in FIG. 5, lobe 124 includes planar portion 152 and lobe 128 includes planar portion 154. Planar portion 152 extends from ridge 146 towards side wall 136. The curved portion of bottom surface 130 meets planar portion 152 along line 156. Planar portion 154 extends from ridge 148 towards side wall 138. The curved portion of bottom surface 134 meets planar portion 154 along line 158. Alternatively, lobe 124 can have a continuous radius of curvature from ridge 146 to side wall 136 and lobe 128 can have a continuous radius of curvature from ridge 148 to side wall 138. Additionally, lobes 124 and 128 can have other geometric shapes between respective side walls 136 and 138 and ridges 146 and 148. FIG. 7 is a cross-sectional view of cooling hole 106 shown in FIG. 5 taken along the line 7-7, and illustrates ridges 146 and 148 and planar portions 152 and 154 in addition to bottom surfaces 130, 132 and 134 and side walls 136 and 138.

Diffusing section 114 also includes transition region 160. Transition region 160 separates lobes 124, 126 and 128 from outlet 116. In some embodiments, transition region 160 also includes portions that are located between adjacent lobes, as shown in FIG. 5. For example, portion 162 of transition region 160 is located between first lobe 124 and second lobe 126 and portion 164 is located between second lobe 126 and third lobe 128. End 166 of transition region 160 is adjacent outlet 116 where the outlet meets outer wall surface 104. Portion 162, located between first lobe 124 and second lobe 126, and portion 164, located between second lobe 126 and third lobe 128, can extend towards metering section 112 to varying degrees. In the embodiment shown in FIG. 5, portions 162 and 164 are present only near the respective trailing edges 140, 142 and 144 of lobes 124, 126 and 128. The location of end 166 of transition region 160 relative to trailing edges 140, 142 and 144 can also vary. In the embodiment shown in FIG. 5, end 166 is spaced from trailing edges 140, 142 and 144. In this embodiment, trailing edges 140, 142 and 144 and hence, first lobe 124, second lobe 126 and third lobe 128, do not extend to outlet 116 or outer wall surface 104, but terminate before reaching transition region 160. Instead, portion 168 of transition region 160 is located between trailing edges 140, 142 and 144 and outlet 116. In other embodiments, trailing edges 140, 142 and 144 are axially aligned or generally equidistant from inlet 110. End 166 of transition region 160 can also be aligned with one or more of trailing edges 140, 142 and 144 so that one or more of lobes 124, 126 and 128 extend to outlet 116. In some embodiments, transition region 160 spans from trailing edge 140 to trailing edge 144 as shown in FIG. 5. Additionally, in some embodiments, end 166 of transition region 160 is straight as shown in FIG. 5.

Figure 6:
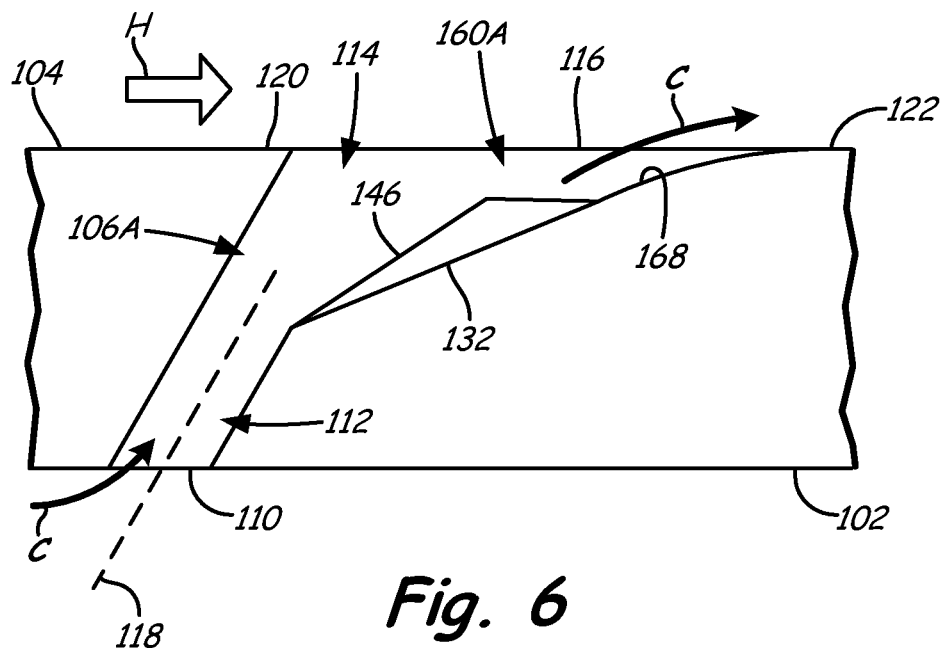
FIG. 6 is a sectional view of another embodiment of a multi-lobed cooling hole.

Transition region 160 (and portions 162, 164 and 168) can take various shapes and have different configurations depending on the location and desired flow profile of cooling hole 106. The bottom surface of transition region 160 can be flat or curved. A curved (longitudinally convex) bottom surface of transition region 160 can facilitate improved flow attachment due to the Coanda effect. FIG. 6 illustrates a sectional view of one embodiment of multi-lobed cooling hole 106A in which portion 168 of transition region 160A is longitudinally convex.

Adding transition region 160 to diffusing section 114 improves the thermo-mechanical fatigue tolerance of multi-lobed cooling hole 106. Without transition region 160, the trailing edge of cooling hole 106 (where outlet 116 and outer wall surface 104 meet) would include sharp edges or corners at the trailing edge of ridges 146 and 148 and at trailing edges 140, 142 and 144 of lobes 124, 126 and 128. These sharp edges and corners are highly susceptible to thermo-mechanical fatigue. Over time, cracks develop in these areas due to the temperature cycling that occurs during operation. These cracks further reduce cooling effectiveness and performance and will eventually lead to failure, requiring replacement or repair of the affected component. Replacing and repairing components is costly both in terms of materials and in aircraft downtime. By incorporating transition region 160 into diffusing section 114, the previously sharp edges and corners are blended into smoother transitions that are less susceptible to thermo-mechanical fatigue. Additionally, smoother transitions near ridges 146 and 148 and trailing edges 140, 142 and 144 reduces the likelihood that cooling air C will "jet off" instead of forming a cooling film along outer wall surface 104.

Figure 8:
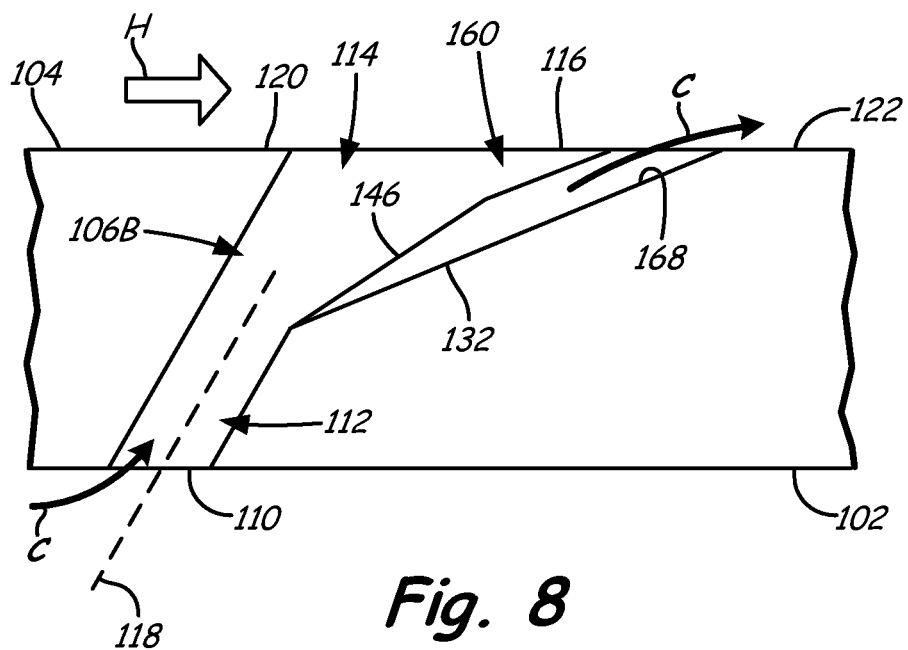
FIG. 8 is a sectional view of another embodiment of a multi-lobed cooling hole.
Figure 9:
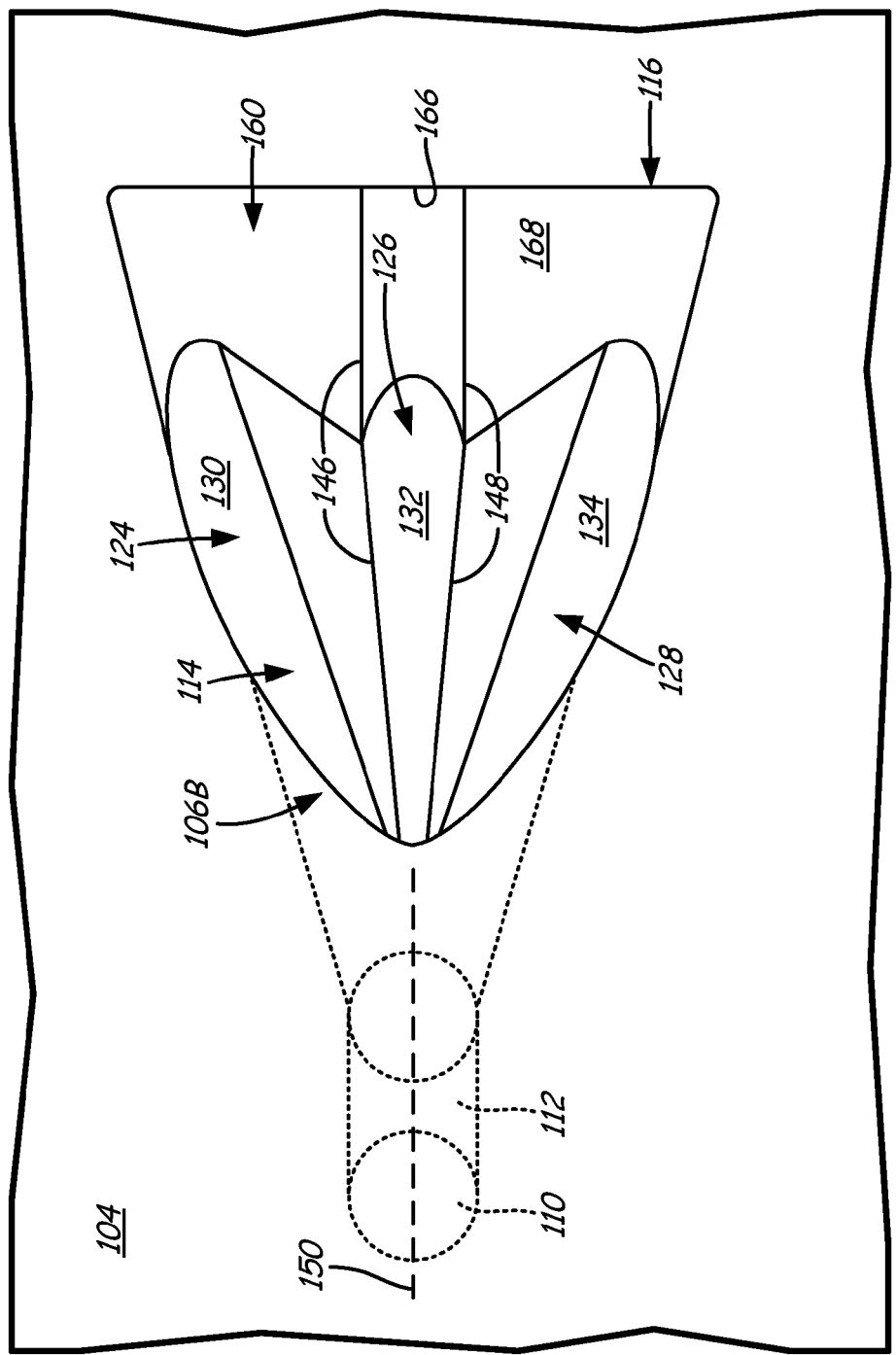
FIG. 9 is a top view of the cooling hole of FIG. 8.

In the embodiment shown in FIGS. 4A and 5, transition region 160 does not contain ridges. Ridges 146 and 148 do not extend to outlet 116. Instead, ridges 146 and 148 transition (taper) to the same depth as bottom surfaces 130, 132 and 134 terminate before reaching transition region 160. As shown in FIG. 4A, portion 168 of transition region 160 separates ridges 146 and 148 from outlet 116. In some alternative embodiments, ridges 146 and 148 extend into transition region 160. FIGS. 8 and 9 illustrate cooling hole 106B, in which ridges 146 and 148 extend through portion 168 of transition region 160 to outlet 116. FIG. 8 is a sectional view of multi-lobed film cooling hole 106B through centerline axis 150 in the same fashion as FIG. 4A. FIG. 9 is a top view of cooling hole 106B shown in FIG. 8. Ridges 146 and 148 can extend through transition region 160 having the same height relative to portion 168 as to bottom surfaces 130, 132 and 134. Alternatively, ridges 146 and 148 can increase or decrease in height as they proceed downstream through portion 168. In some embodiments, ridges 146 and 148 transition (taper) to the same depth as portion 168 so that they do not extend downstream all the way to outlet 116. Ridges 146 and 148 in transition region 160 help prevent the flow of cooling air C from separating downstream of lobes 124, 126 and 128.

Figure 10:
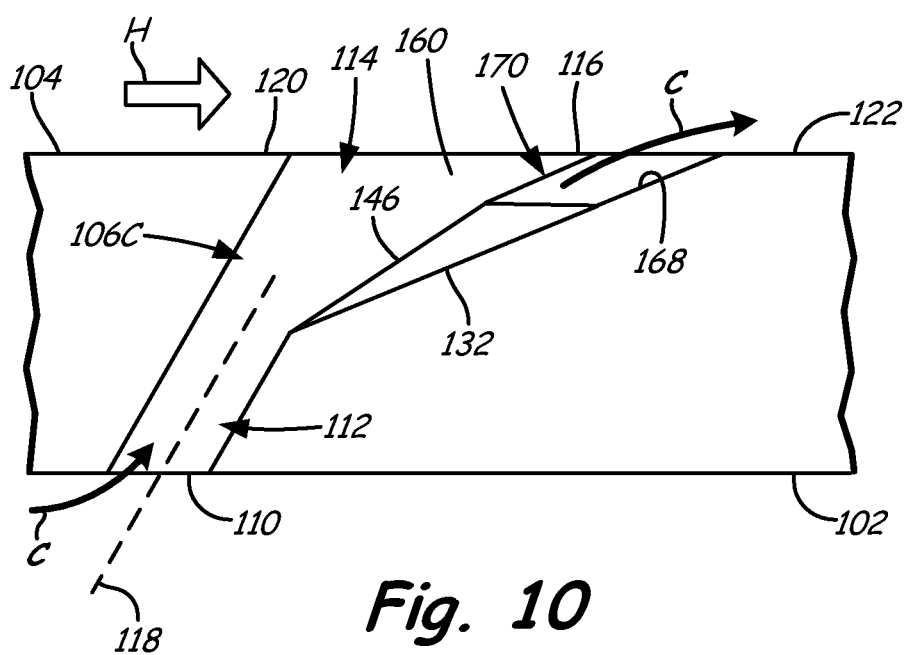
FIG. 10 is a sectional view of another embodiment of a multi-lobed cooling hole.
Figure 11:
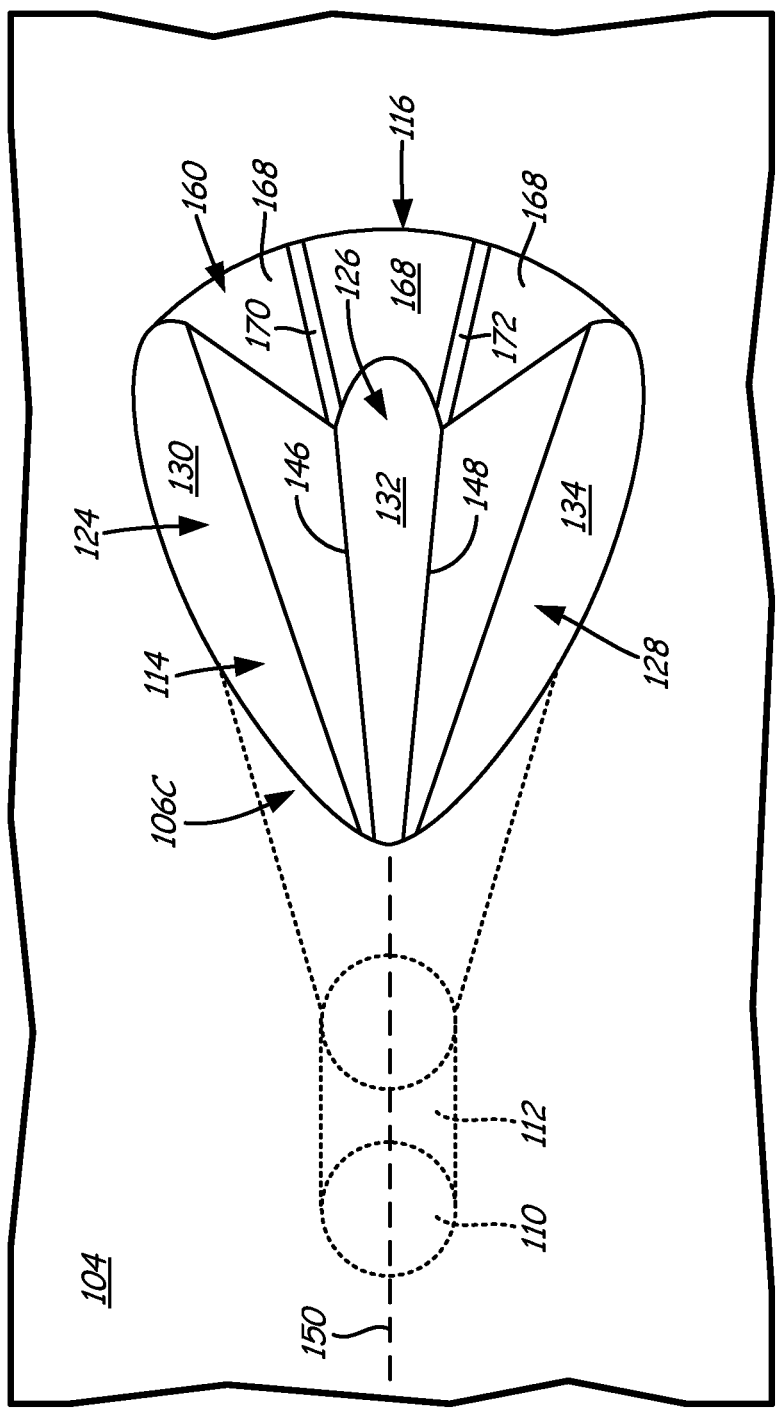
FIG. 11 is a top view of the cooling hole of FIG. 10.

In other embodiments, ridges 146 and 148 do not extend through transition region 160, but ribs are located in transition region 160 instead. FIGS. 10 and 11 illustrate cooling hole 106C, in which ribs 170 and 172 are located on portion 168 of transition region 160. FIG. 10 is a sectional view of multi-lobed film cooling hole 106C through centerline axis 150 in the same fashion as FIGS. 4A, 6 and 7. FIG. 11 is a top view of cooling hole 106C shown in FIG. 10. Like ridges 146 and 148, ribs 170 and 172 help prevent the flow of cooling air C from separating downstream of lobes 124, 126 and 128. Ribs 170 and 172 do not necessarily follow the same path as ridges 146 and 148, however. In some embodiments, ribs 170 and 172 are parallel to and aligned with ridges 146 and 148, respectively. In other embodiments, as shown in FIG. 10, ribs 170 and 172 are aligned with, but are not parallel to, ridges 146 and 148. The ribs and ridges are aligned in that the upstream ends of ribs 170 and 172 meet the downstream ends of ridges 146 and 148. However, ribs 170 and 172 diverge laterally so that the downstream ends of ribs 170 and 172 are farther apart than their upstream ends. By increasing their lateral divergence or adding curvature, ribs 170 and 172 can better spread cooling air C throughout diffusing section 114. As with ridges 146 and 148, ribs 170 and 172 can extend through transition region 160 having the same height relative to portion 168 as ridges 146 and 148 have to bottom surfaces 130, 132 and 134. Alternatively, ribs 170 and 172 can have lesser or greater heights or increase or decrease in height as they proceed downstream through portion 168. In some embodiments, ribs 170 and 172 transition (taper) to the same depth as portion 168 so that they do not extend downstream all the way to outlet 116. FIG. 10 also illustrates outlet 116 having a curved trailing edge rather than a straight trailing edge. In other embodiments, outlet 116 can have a trailing edge with a combination of curved and straight portions (i.e. the trailing edge is curved at the lateral edges and straight in the center).

Figure 12A:
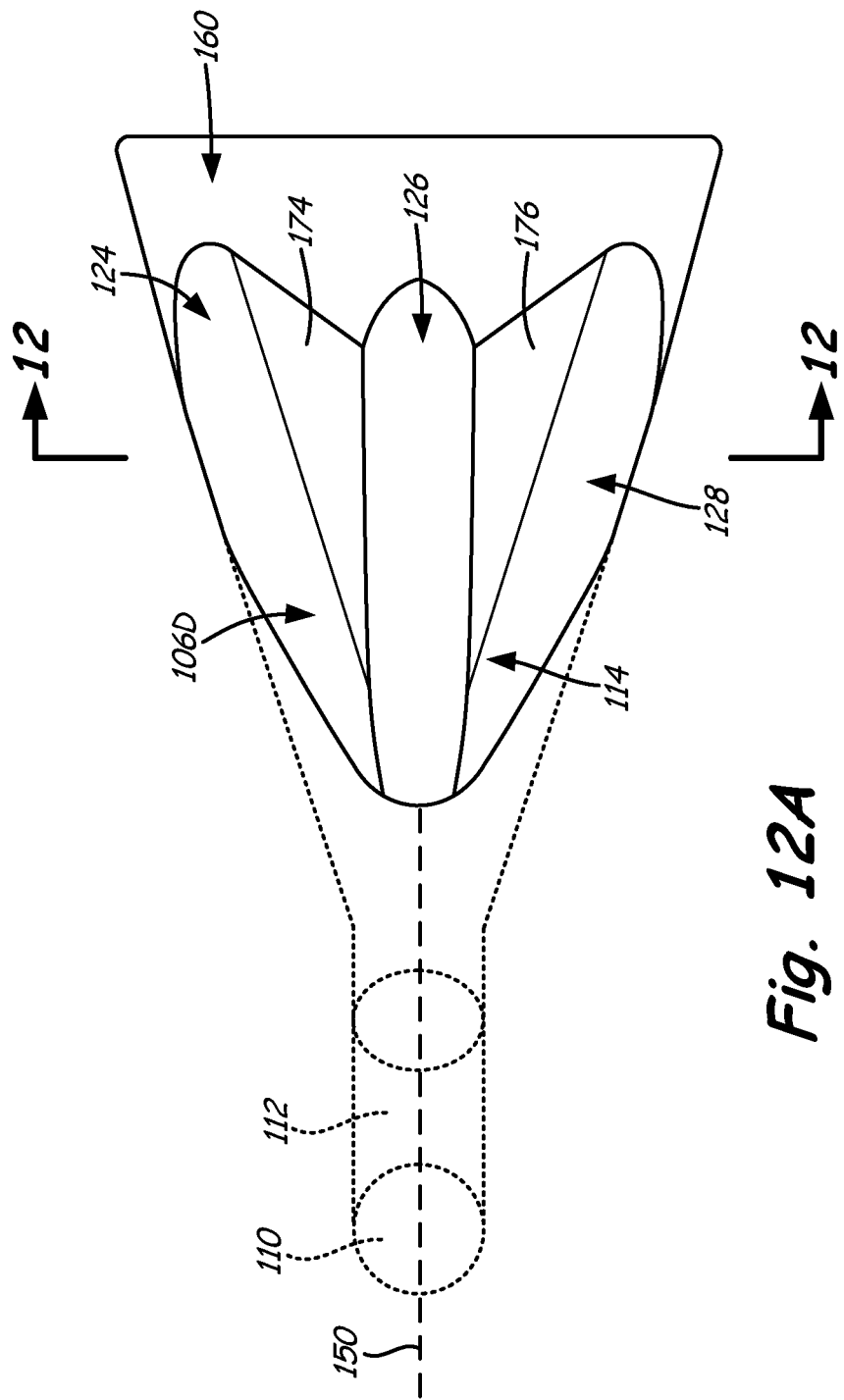
FIG. 12A is a top view of a tri-lobed cooling hole.
Figure 12B:
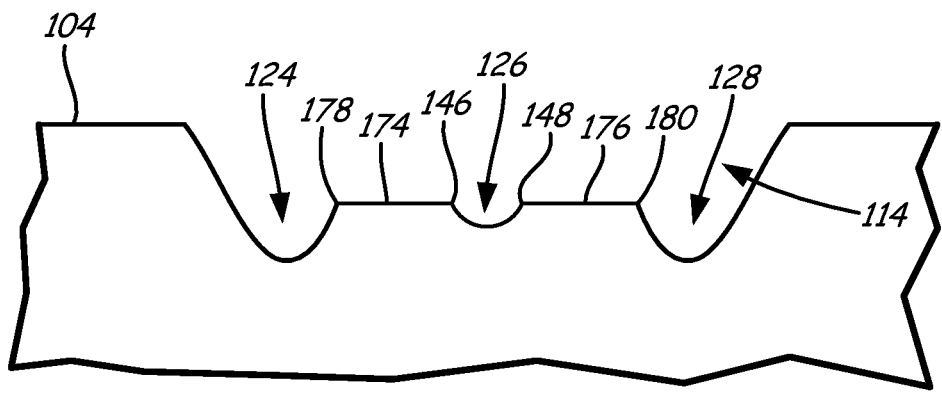
FIG. 12B is a cross-sectional view of one embodiment of the cooling hole of FIG. 12A taken along the line 12-12.
Figure 12C:
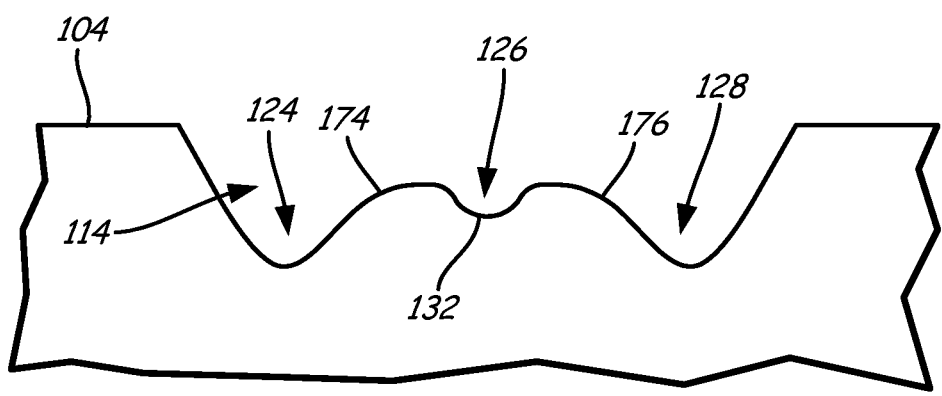
FIG. 12C is a cross-sectional view of another embodiment of the cooling hole of FIG. 12A taken along the line 12-12.

FIGS. 12A-12C are views of additional embodiments of a multi-lobed cooling hole. FIG. 12A illustrates a top view of a multi-lobed cooling hole 106D. As shown in FIG. 12A, cooling hole 106D includes diffusing section 114 having three lobes (124, 126 and 128) and transition region 160. Adjacent lobes are separated by a surface. Surface 174 separates lobes 124 and 126 and surface 176 separates lobes 126 and 128. Surfaces 174 and 176 are similar to planar portions 152 and 154, described above and shown in FIGS. 5 and 7. As shown in FIGS. 12B and 12C, surfaces 174 and 176 can have different shapes and orientations. FIGS. 12B and 12C are cross-sectional views of different embodiments of the cooling hole of FIG. 12A taken along the line 12-12. In FIG. 12B, surface 174 extends from lobe 124 towards lobe 126 horizontally, forming ridge 178 near lobe 124 in addition to ridge 146 formed near lobe 126. Surface 176 extends from lobe 128 towards lobe 126 horizontally, forming ridge 180 near lobe 128 in addition to ridge 148 formed near lobe 126. Each of the surfaces 174 and 176 forms a plateau-like surface between adjacent lobes as shown in FIG. 12B. Surfaces 174 and 176 are located within diffusing section 114 below outlet 116 at second wall surface 104. In FIG. 12C, surface 174 extends generally upwards from lobe 124 towards lobe 126. Surface 174 is curved and at least a portion of surface 174 is closer to outlet 116 than bottom surface 132 of lobe 126. Surface 176 extends generally upwards from lobe 128 towards lobe 126. Surface 176 is curved and at least a portion of surface 176 is closer to outlet 116 than bottom surface 132 of lobe 126.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Figure 13A:
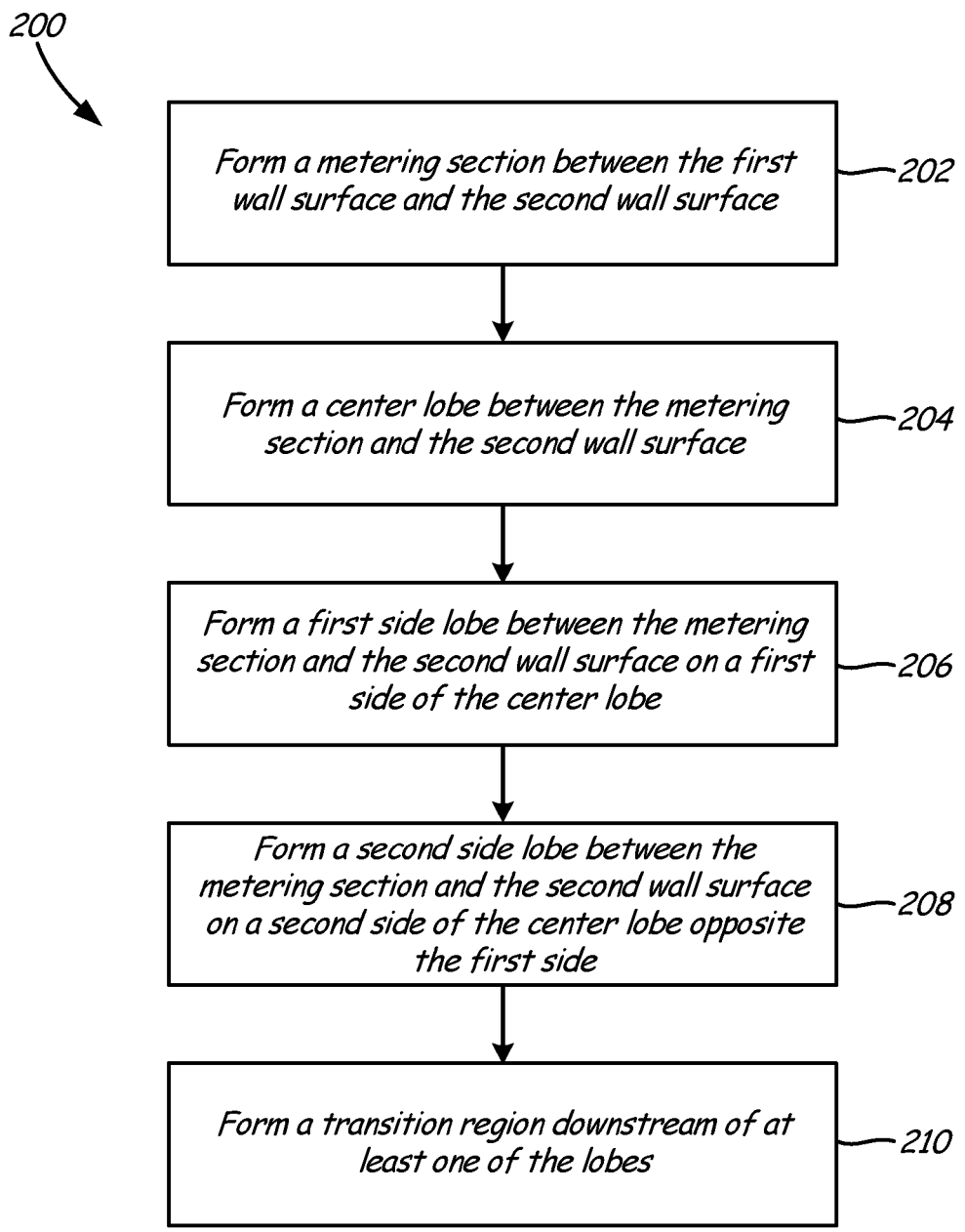
FIG. 13A is a simplified flow diagram illustrating one embodiment of a method for producing a multi-lobed cooling hole in a gas turbine engine wall.

FIG. 13A is a simplified flow diagram illustrating one embodiment of a method for producing a multi-lobed cooling hole in a gas turbine engine wall having first and second wall surfaces. Method 200 includes forming a metering section between the first and second surfaces (step 202), forming a center lobe between the metering section and the second wall surface (step 204), forming a first side lobe between the metering section and the second wall surface on a first side of the center lobe (step 206), forming a second side lobe between the metering section and the second wall surface on a second side of the center lobe opposite the first side (step 208) and forming a transition region downstream of at least one of the lobes (step 210). Metering section 112 is formed in step 202 by one or more of the casting, machining or drilling techniques described above. The technique(s) chosen is/are typically determined based on performance, reproducibility and cost. In embodiments where step 202 occurs prior to steps 204, 206, 208 and 210, inlet 110 and portions of diffusing section 114 and outlet 116 can also be formed during formation of metering section 112. Diffusing section 114 is formed in steps 204, 206, 208 and 210 by one or more of the casting, machining or drilling techniques described above. As with metering section 112, the technique(s) chosen is/are typically determined based on performance, reproducibility and cost. Diffusing section 114 is formed in steps 204, 206, 208 and 210 so that the center lobe extends axially from the metering section and diverges longitudinally from the metering section, the first side lobe diverges longitudinally and laterally from the metering section, the second side lobe diverges longitudinally and laterally from the metering section, and the transition region extends between at least one of the lobes and the outlet.

Figure 13B:
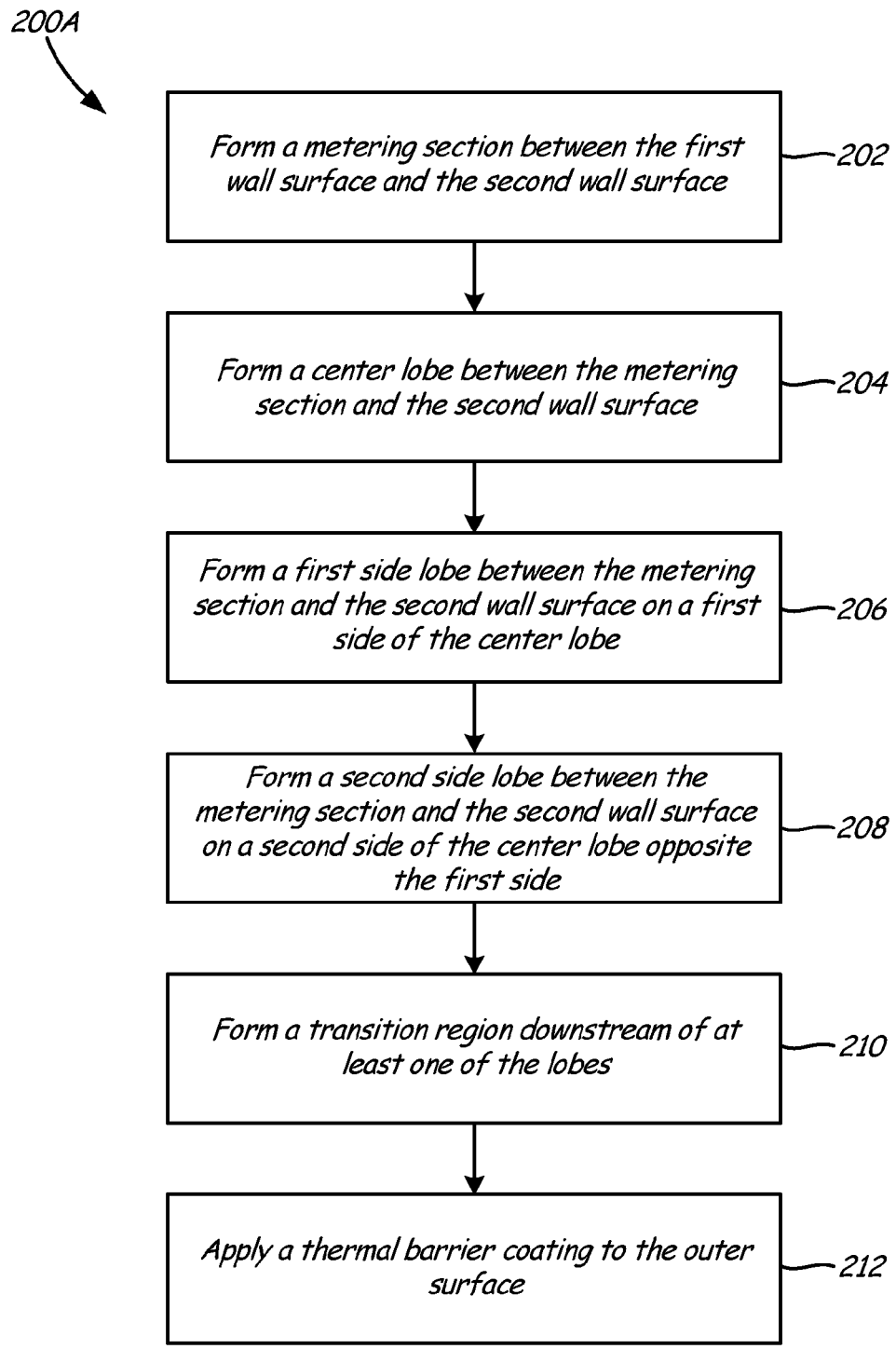
FIG. 13B is a simplified flow diagram illustrating another embodiment of a method for producing a multi-lobed cooling hole in a gas turbine engine wall.

In embodiments where step 202 occurs prior to steps 204, 206, 208 and 210, outlet 116 is fully formed once steps 204, 206, 208 and 210 have been completed. Method 200 can be performed before or after an optional thermal barrier coating application. In optional step 212 (shown as a step in method 200A in FIG. 13B), a thermal barrier coating is applied to outer wall surface 104. Application of the thermal barrier coating can also include the application of a bond coating prior to the thermal barrier coating. The steps of method 200A can be performed in any order depending on the location of cooling hole 106 and the location of diffusing section 114 relative to the metallic wall and the thermal barrier coating. As previously stated, the order of the steps can affect the machining or drilling techniques chosen.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A gas turbine engine component can include a wall having first and second wall surfaces and a cooling hole extending through the wall. The cooling hole can include an inlet located at the first wall surface, an outlet located at the second wall surface, a metering section extending downstream from the inlet and a diffusing section extending from the metering section to the outlet. The diffusing section can include a first lobe diverging longitudinally and laterally from the metering section, a second lobe adjacent the first lobe and diverging longitudinally from the metering section, a third lobe adjacent the second lobe and diverging longitudinally and laterally from the metering section, and a transition region having an end adjacent the outlet and a portion that extends between the lobes and the outlet. The first and third lobes can each include a curved outer portion.

The system of the preceding paragraph can optionally include, additionally and/or alternatively any, one or more of the following features, configurations and/or additional components:

the second lobe can include a curved bottom portion;

the first lobe and the second lobe can meet at a first ridge, and the second lobe and the third lobe can meet at a second ridge;

the first ridge can extend into a portion of the transition region, and the second ridge can extend into a portion of the transition region;

the transition region can include a first rib aligned with the first ridge and a second rib aligned with the second ridge;

the first and second ridges can terminate upstream of the transition region;

the first lobe can further include a substantially planar portion located between the first ridge and the curved outer portion of the first lobe, and the third lobe can further include a substantially planar portion located between the second ridge and the curved outer portion of the third lobe;

the second lobe can be curved between the first and second ridges;

the first, second and third lobes can each include a trailing edge, and the trailing edges of the first, second and third lobes can terminate upstream of the outlet;

the end of the transition region adjacent the outlet can be straight;

the end of the transition region adjacent the outlet can be curved;

the portion of the transition region that extends between the lobes and the outlet can be longitudinally convex;

the diffusing section can further include a first substantially horizontal surface located between the first lobe and the second lobe and a second substantially horizontal surface located between the third lobe and the second lobe; and/or the diffusing section can further include a first curved surface located between the first lobe and the second lobe and a second curved surface located between the third lobe and the second lobe; a portion of the first curved surface can be positioned between the outlet and the curved bottom portion of the second lobe, and a portion of the second curved surface can be positioned between the outlet and the curved bottom portion of the second lobe.

A wall of a component of a gas turbine engine can include first and second wall surfaces, an inlet located at the first wall surface, an outlet located at the second wall surface, a metering section commencing at the inlet and extending downstream from the inlet and a diffusing section extending from the metering section and terminating at the outlet. The diffusing section can include a first lobe diverging longitudinally and laterally from the metering section, a second lobe adjacent the first lobe and diverging longitudinally from the metering section, a third lobe adjacent the second lobe and diverging longitudinally and laterally from the metering section, and a transition region having an end adjacent the outlet and a portion that extends between the lobes and the outlet.

The system of the preceding paragraph can optionally include, additionally and/or alternatively any, one or more of the following features, configurations and/or additional components:

the first lobe and the second lobe can meet at a first ridge, and the second lobe and the third lobe can meet at a second ridge;

the first ridge can extend into a portion of the transition region, and the second ridge can extend into a portion of the transition region;

the transition region can include a first rib aligned with the first ridge and a second rib aligned with the second ridge;

the first and second ridges can terminate upstream of the transition region;

the first lobe can include a curved outer portion and a substantially planar portion located between the first ridge and the curved outer portion of the first lobe, and the third lobe can include a curved outer portion and a substantially planar portion located between the second ridge and the curved outer portion of the third lobe;

the second lobe can be curved between the first and second ridges;

the first, second and third lobes can each include a trailing edge, and the trailing edges of the first, second and third lobes can terminate upstream of the outlet;

the end of the transition region adjacent the outlet can be straight;

the end of the transition region adjacent the outlet can be curved; and/or the portion of the transition region that extends between the lobes and the outlet can be longitudinally convex.

A method for producing a cooling hole in a gas turbine engine wall having first and second wall surfaces includes forming a metering section, forming a center lobe, forming a first side lobe, forming a second side lobe and forming a transition region. The metering section is formed between the first wall surface and the second wall surface, and the metering section meters a flow of fluid through the cooling hole. The center lobe is formed between the metering section and the second wall surface, and the center lobe extends axially from the metering section and diverges longitudinally from the metering section. The first side lobe is formed between the metering section and the second wall surface on a first side of the center lobe, and the first side lobe diverges longitudinally and laterally from the metering section. The second side lobe is formed between the metering section and the second wall surface on a second side of the center lobe opposite the first side, and the second side lobe diverges longitudinally and laterally from the metering section. The transition region is formed downstream of at least one of the lobes, such that the transition region extends between the lobes and the outlet.

The system of the preceding paragraph can optionally include, additionally and/or alternatively any, one or more of the following features, configurations and/or additional components:

forming the metering section, the center lobe, the first side lobe and the second side lobe can be performed by electrical discharge machining, laser drilling, laser machining, electrical chemical machining, waterjet machining, casting, conventional machining and combinations thereof.

A gas turbine engine component includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally from the metering section, a second lobe adjacent the first lobe and diverging longitudinally from the metering section, a third lobe adjacent the second lobe and diverging longitudinally from the metering section, and a transition region having an end adjacent the outlet and a portion that extends between the lobes and the outlet.

The invention claimed is:

1. A gas turbine engine component comprising:
a wall having first and second wall surfaces and defining a cooling hole extending through the wall, the cooling hole including:
an inlet located at the first wall surface;
an outlet located at the second wall surface;
a metering section extending downstream from the inlet; and
a diffusing section extending from the metering section to the outlet, the diffusing section comprising:
a first lobe diverging longitudinally in a first direction and laterally from the metering section, the first lobe comprising a curved outer portion;
a second lobe adjacent the first lobe and diverging longitudinally in the first direction from the metering section; and
a third lobe adjacent the second lobe and diverging longitudinally in the first direction and laterally from the metering section, the third lobe comprising a curved outer portion; and
a transition region having an end adjacent the outlet and a portion that extends upstream of the outlet and between at least one of the first, second and third lobes and the outlet.

2. The component of claim 1, wherein the second lobe comprises a curved bottom portion.

3. The component of claim 2, wherein the diffusing section further comprises:
a first curved surface located between the first lobe and the second lobe; and
a second curved surface located between the third lobe and the second lobe, wherein a portion of the first curved surface is positioned between the outlet and the curved bottom portion of the second lobe, and wherein a portion of the second curved surface is positioned between the outlet and the curved bottom portion of the second lobe.

4. The component of claim 1, wherein the first lobe and the second lobe meet at a first ridge, and wherein the second lobe and the third lobe meet at a second ridge.

5. The component of claim 4, wherein the first ridge extends into a portion of the transition region, and wherein the second ridge extends into a portion of the transition region.

6. The component of claim 4, wherein the transition region comprises:
a first rib aligned with the first ridge; and
a second rib aligned with the second ridge.

7. The component of claim 4, wherein the first and second ridges terminate upstream of the transition region.

8. The component of claim 4, wherein the first lobe further comprises a substantially planar portion located between the first ridge and the curved outer portion of the first lobe, and wherein the third lobe further comprises a substantially planar portion located between the second ridge and the curved outer portion of the third lobe.

9. The component of claim 4, wherein the second lobe is curved between the first and second ridges.

10. The component of claim 1, wherein the first, second and third lobes each comprise a trailing edge, and wherein the trailing edges of the first, second and third lobes terminate upstream of the outlet.

11. The component of claim 1, wherein the end of the transition region adjacent the outlet is straight.

12. The component of claim 1, wherein the end of the transition region adjacent the outlet is curved.

13. The component of claim 1, wherein the portion of the transition region that extends between the lobes and the outlet is longitudinally convex.

14. The component of claim 1, wherein the diffusing section further comprises:
a first substantially horizontal surface located between the first lobe and the second lobe; and
a second substantially horizontal surface located between the third lobe and the second lobe.

15. A wall of a component of a gas turbine engine, the wall comprising:
first and second wall surfaces;
an inlet located at the first wall surface;
an outlet located at the second wall surface;
a metering section commencing at the inlet and extending downstream from the inlet; and
a diffusing section extending from the metering section and terminating at the outlet, the diffusing section comprising:
a first lobe diverging longitudinally in a first direction and laterally from the metering section;
a second lobe adjacent the first lobe and diverging longitudinally in the first direction from the metering section;
a third lobe adjacent the second lobe and diverging longitudinally in the first direction and laterally from the metering section; and
a transition region having an end adjacent the outlet and a portion that extends upstream of the outlet and between at least one of the first, second and third lobes and the outlet.

16. The wall of claim 15, wherein the first lobe and the second lobe meet at a first ridge, and wherein the second lobe and the third lobe meet at a second ridge.

17. The wall of claim 16, wherein the first ridge extends into a portion of the transition region, and wherein the second ridge extends into a portion of the transition region.

18. The wall of claim 16, wherein the transition region comprises:
a first rib aligned with the first ridge; and
a second rib aligned with the second ridge.

19. The wall of claim 16, wherein the first and second ridges terminate upstream of the transition region.

20. The wall of claim 16, wherein the first lobe comprises a curved outer portion and a substantially planar portion located between the first ridge and the curved outer portion of the first lobe, and wherein the third lobe comprises a curved outer portion and a substantially planar portion located between the second ridge and the curved outer portion of the third lobe.

21. The wall of claim 16, wherein the second lobe is curved between the first and second ridges.

22. The wall of claim 15, wherein the first, second and third lobes each comprise a trailing edge, and wherein the trailing edges of the first, second and third lobes terminate upstream of the outlet.

23. The wall of claim 15, wherein the end of the transition region adjacent the outlet is straight.

24. The wall of claim 15, wherein the end of the transition region adjacent the outlet is curved.

25. The wall of claim 15, wherein the portion of the transition region that extends between the lobes and the outlet is longitudinally convex.

26. A method for producing a cooling hole in a gas turbine engine wall having first and second wall surfaces, the method comprising:
forming a metering section between the first wall surface and the second wall surface, wherein the metering section meters a flow of fluid through the cooling hole;
forming a center lobe between the metering section and the second wall surface, wherein the center lobe extends axially from the metering section and diverges longitudinally in a first direction from the metering section;
forming a first side lobe between the metering section and the second wall surface on a first side of the center lobe, wherein the first side lobe diverges longitudinally in the first direction and laterally from the metering section;
forming a second side lobe between the metering section and the second wall surface on a second side of the center lobe opposite the first side, wherein the second side lobe diverges longitudinally in the first direction and laterally from the metering section; and
forming a transition region downstream of at least one of the lobes, such that the transition region extends from the at least one lobe to the second wall surface.

27. The method of claim 26, wherein the steps of forming the metering section, forming the center lobe, forming the first side lobe and forming the second side lobe are performed by electrical discharge machining, laser drilling, laser machining, electrical chemical machining, waterjet machining, casting, conventional machining and combinations thereof.

28. A gas turbine engine component comprising:
a wall having first and second wall surfaces and defining a cooling hole extending through the wall, the cooling hole including:
an inlet located at the first wall surface;
an outlet located at the second wall surface;
a metering section extending downstream from the inlet; and
a diffusing section extending from the metering section to the outlet, the diffusing section comprising:
a first lobe diverging longitudinally in a first direction from the metering section;
a second lobe adjacent the first lobe and diverging longitudinally in the first direction from the metering section; and
a third lobe adjacent the second lobe and diverging longitudinally in the first direction from the metering section; and
a transition region having an end adjacent the outlet and a portion that extends between at least one of the first, second and third lobes and the outlet.

* * * * *